Jan. 4, 1938.                C. H. GREEN                 2,104,032
                         AUTOMATIC PHONOGRAPH
                        Filed Feb. 20, 1934        9 Sheets-Sheet 1
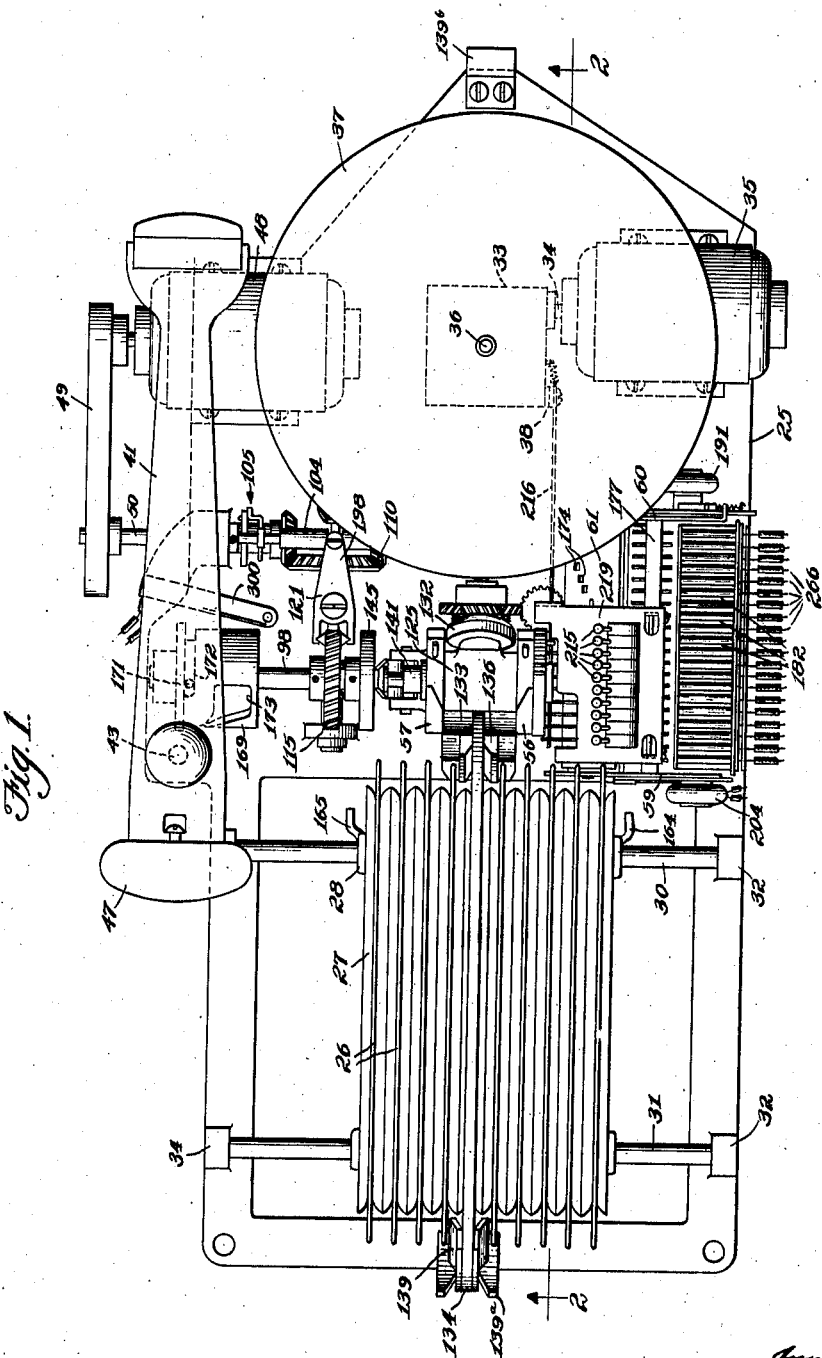
Inventor:
Clifford H. Green
By John E. Titus
          Atty.

Jan. 4, 1938.　　　C. H. GREEN　　　2,104,032
AUTOMATIC PHONOGRAPH
Filed Feb. 20, 1934　　　9 Sheets-Sheet 2
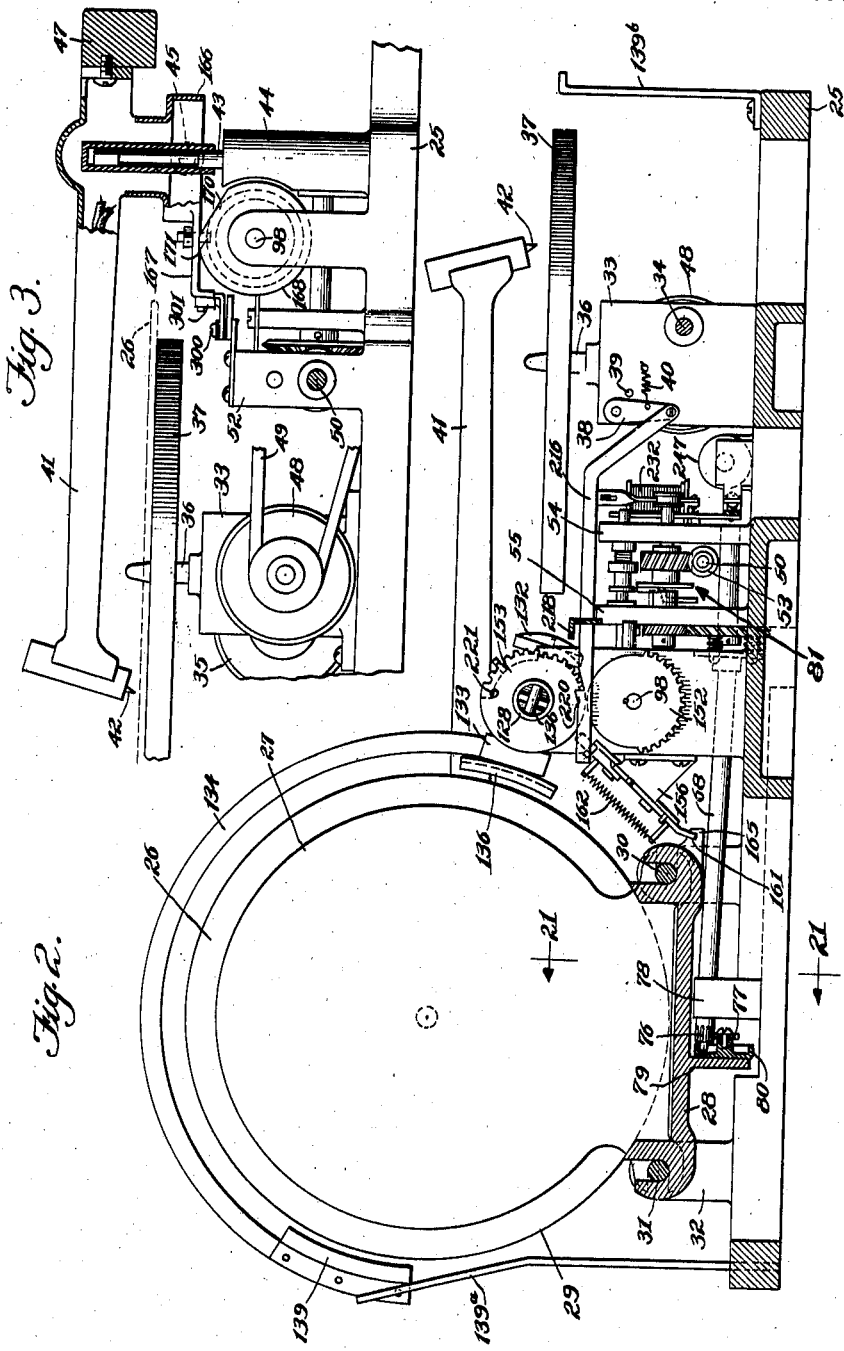
Inventor:
Clifford H. Green
By John E. Titus Atty.

Jan. 4, 1938.  C. H. GREEN  2,104,032
AUTOMATIC PHONOGRAPH
Filed Feb. 20, 1934  9 Sheets-Sheet 3
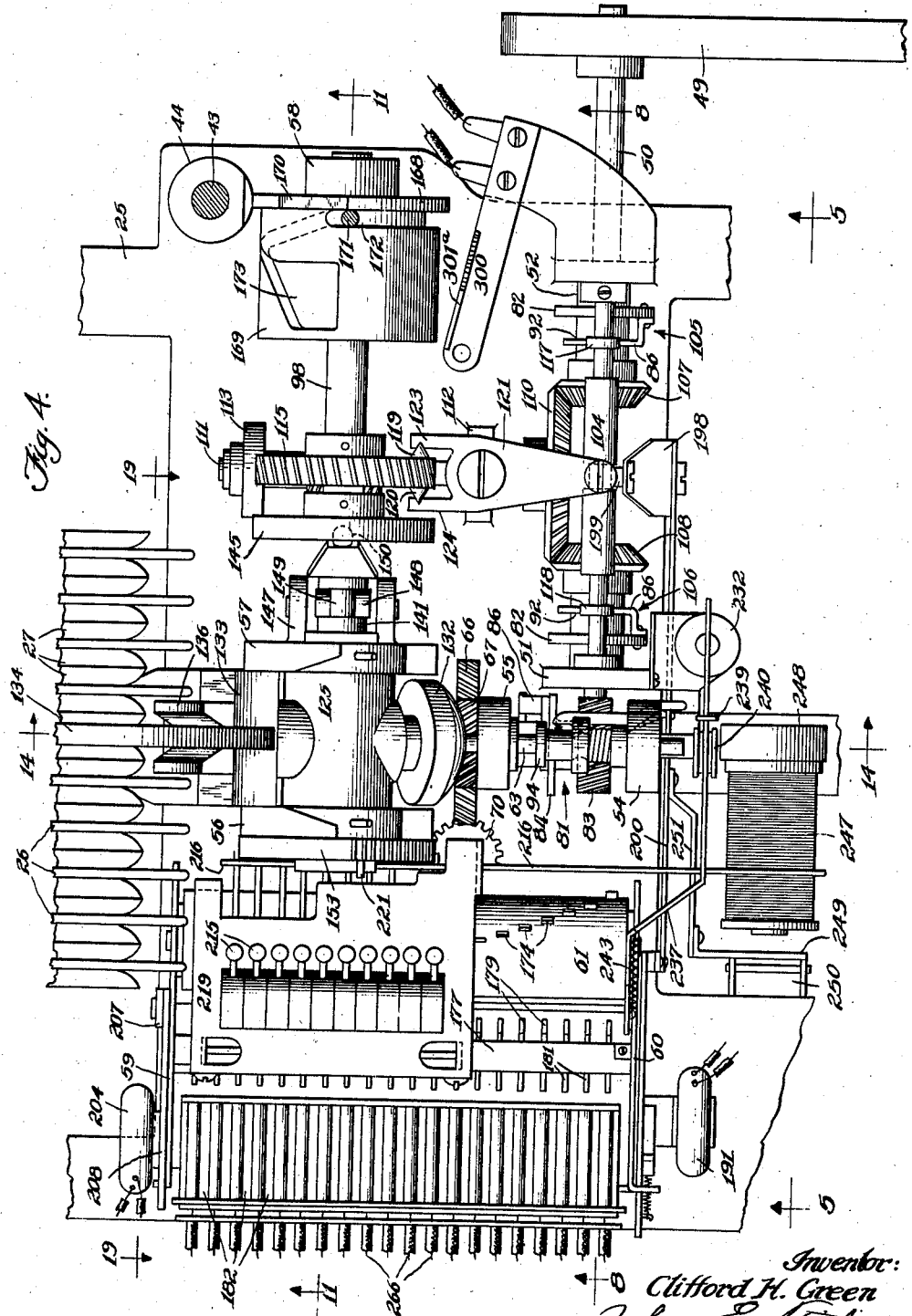
Inventor:
Clifford H. Green
By John E. Titus
Atty Jan. 4, 1938.   C. H. GREEN   2,104,032
AUTOMATIC PHONOGRAPH
Filed Feb. 20, 1934   9 Sheets-Sheet 4
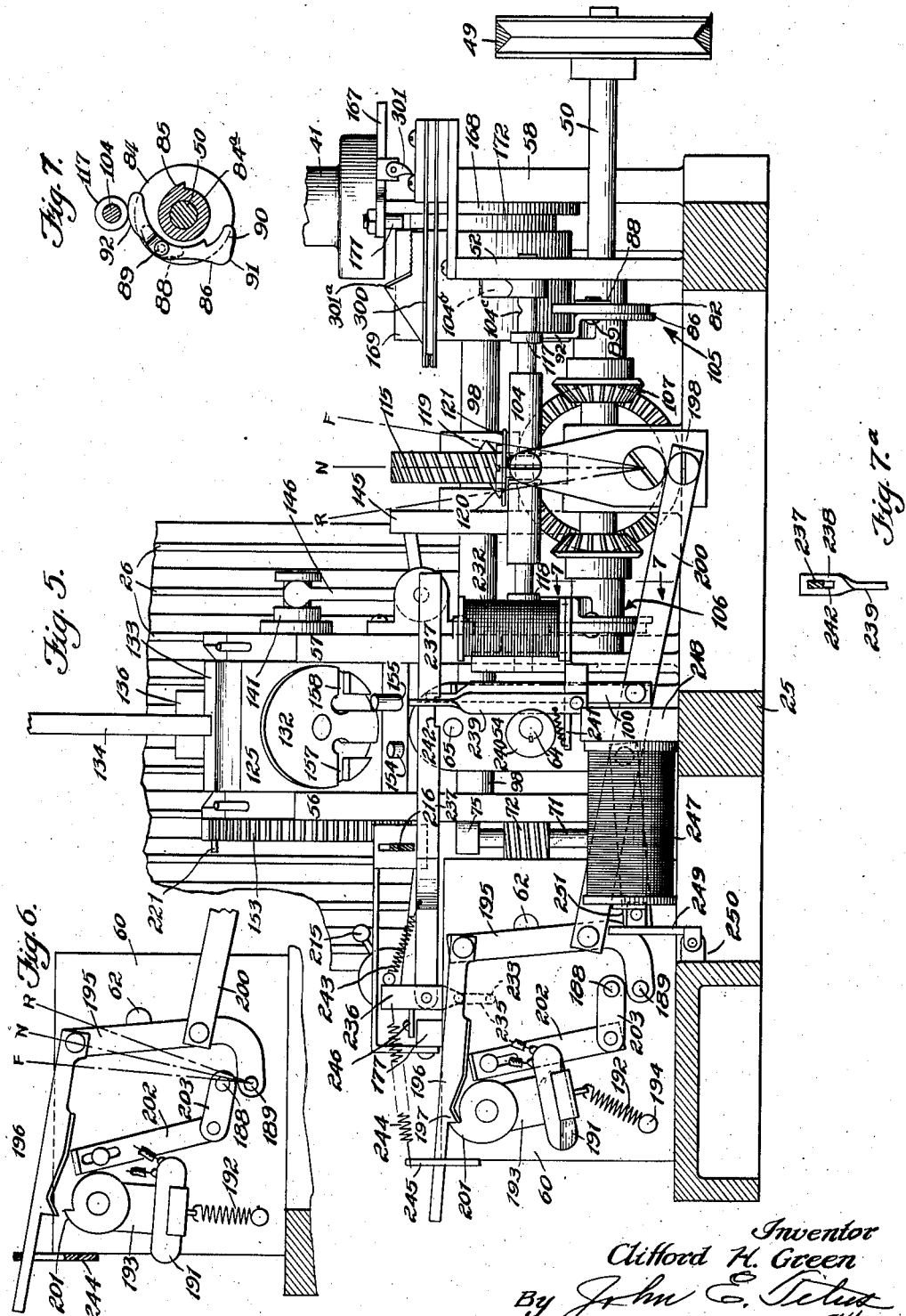
Inventor
Clifford H. Green
By John E. Tetus
Atty.

Jan. 4, 1938. C. H. GREEN 2,104,032
AUTOMATIC PHONOGRAPH
Filed Feb. 20, 1934 9 Sheets-Sheet 5
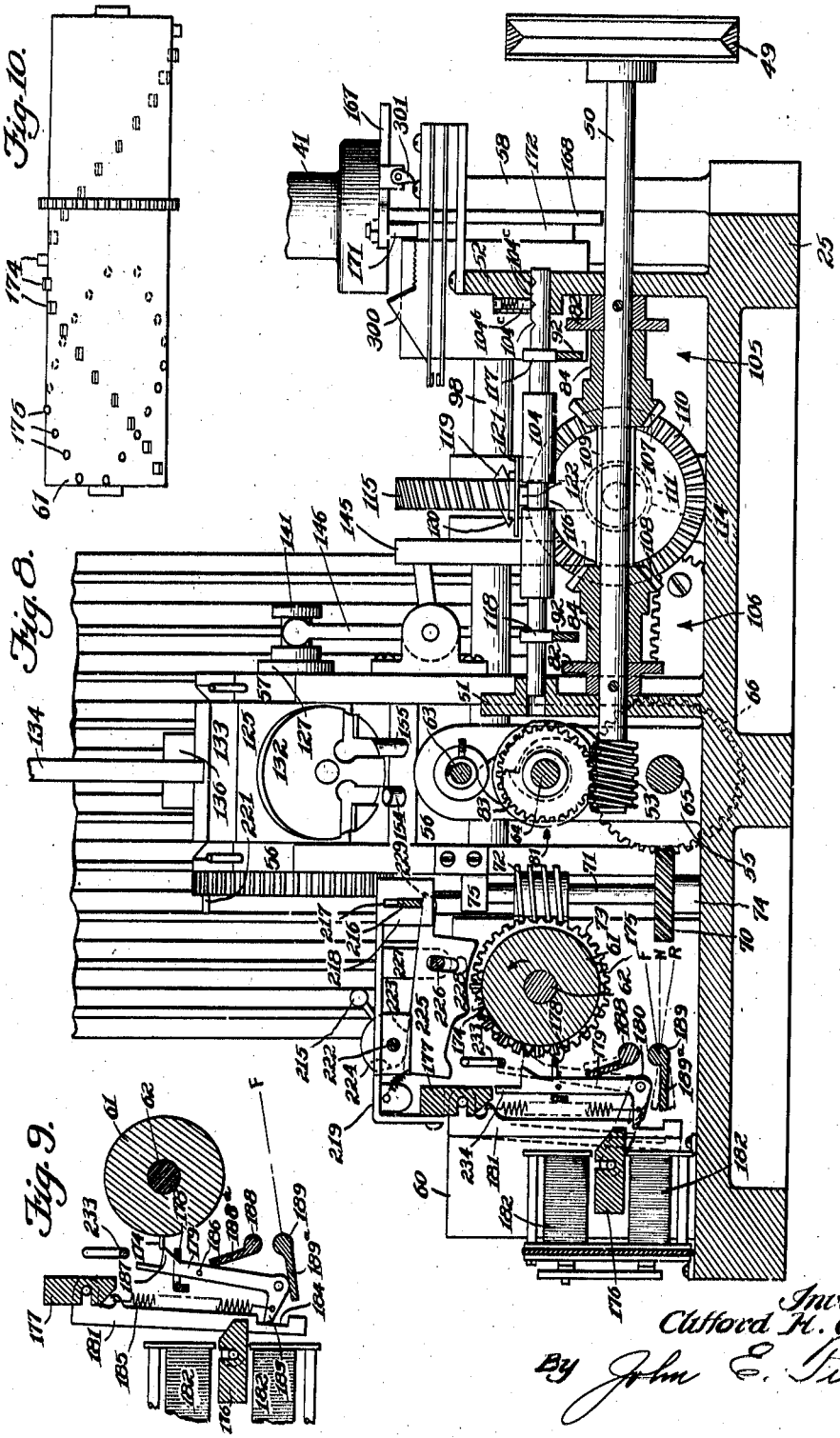
Inventor:
Clifford H. Green
By John E. Titus
Atty.

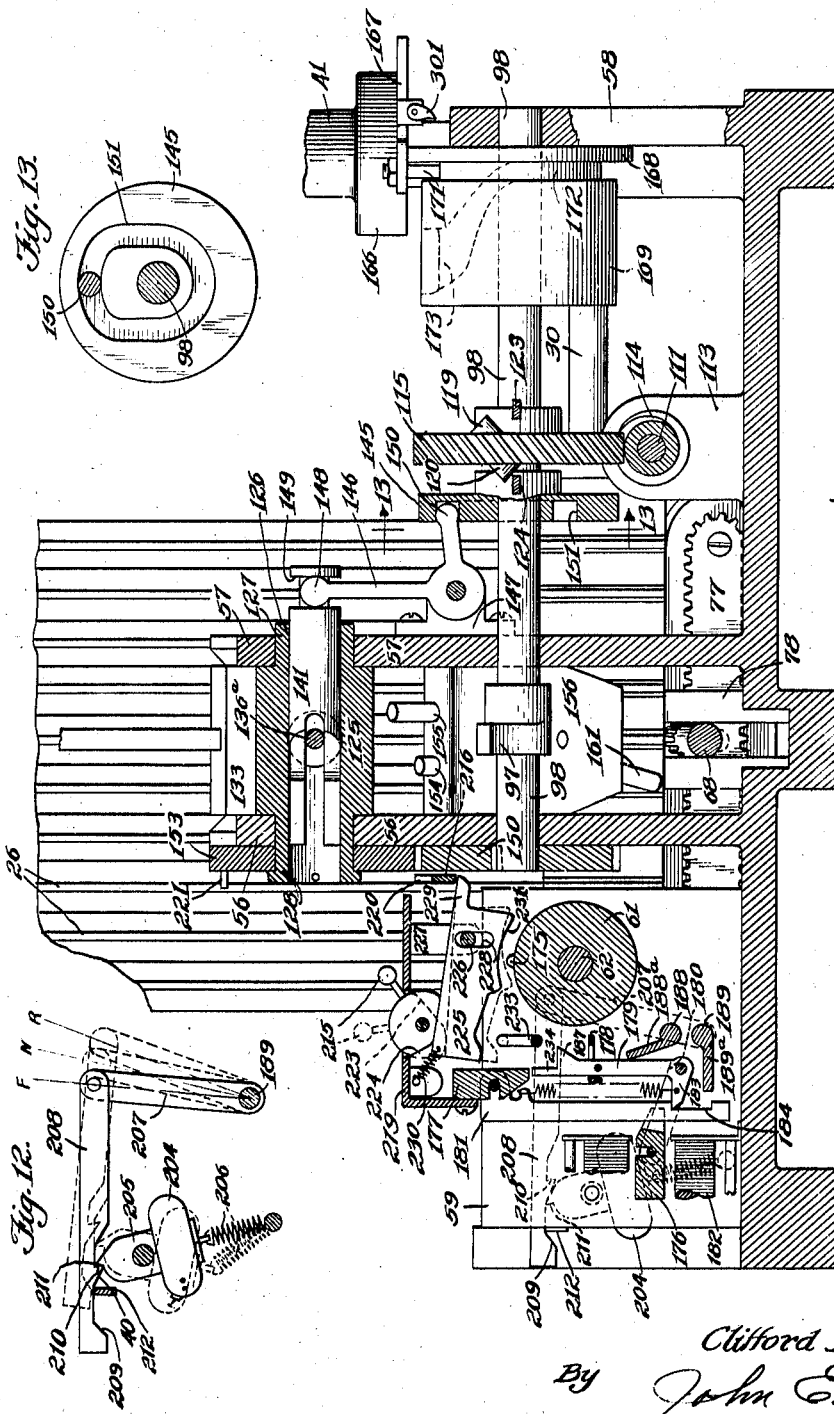

Jan. 4, 1938.                C. H. GREEN                   2,104,032
                        AUTOMATIC PHONOGRAPH
                  Filed Feb. 20, 1934            9 Sheets-Sheet 7
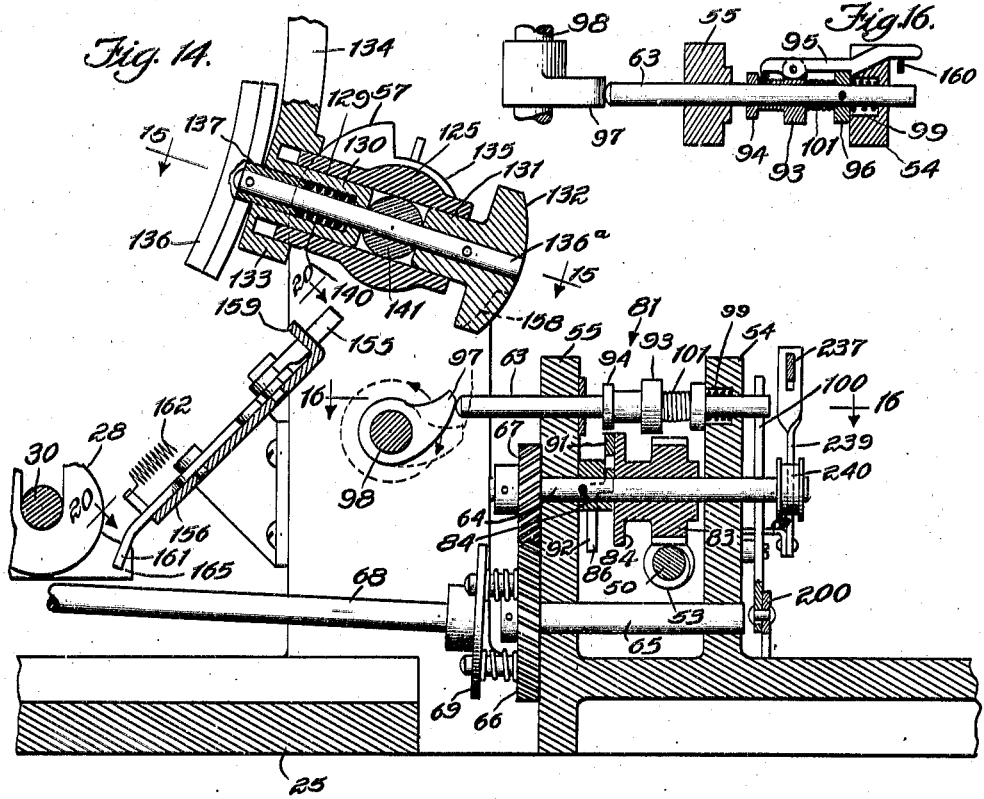
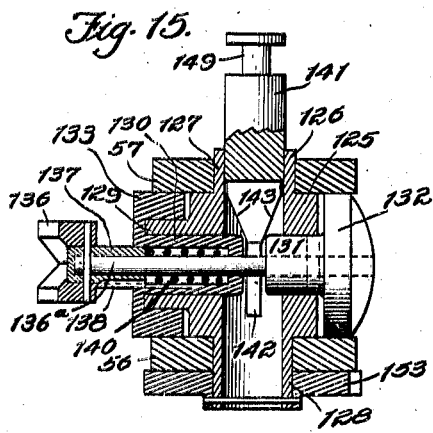
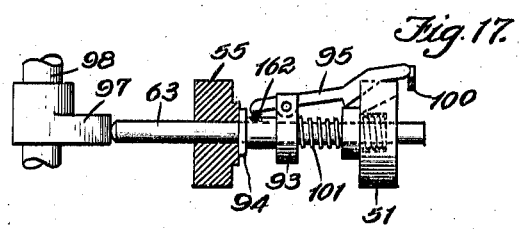
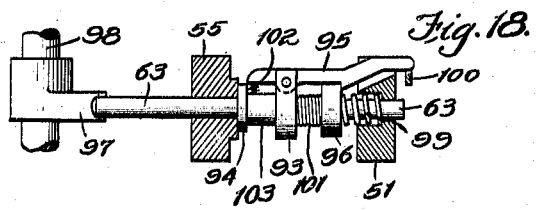
INVENTOR.
Clifford H. Green
BY
John E. Titus
ATTORNEY.

Jan. 4, 1938.    C. H. GREEN    2,104,032
AUTOMATIC PHONOGRAPH
Filed Feb. 20, 1934    9 Sheets-Sheet 8

INVENTOR.
Clifford H. Green
BY John E. Titus
ATTORNEY.

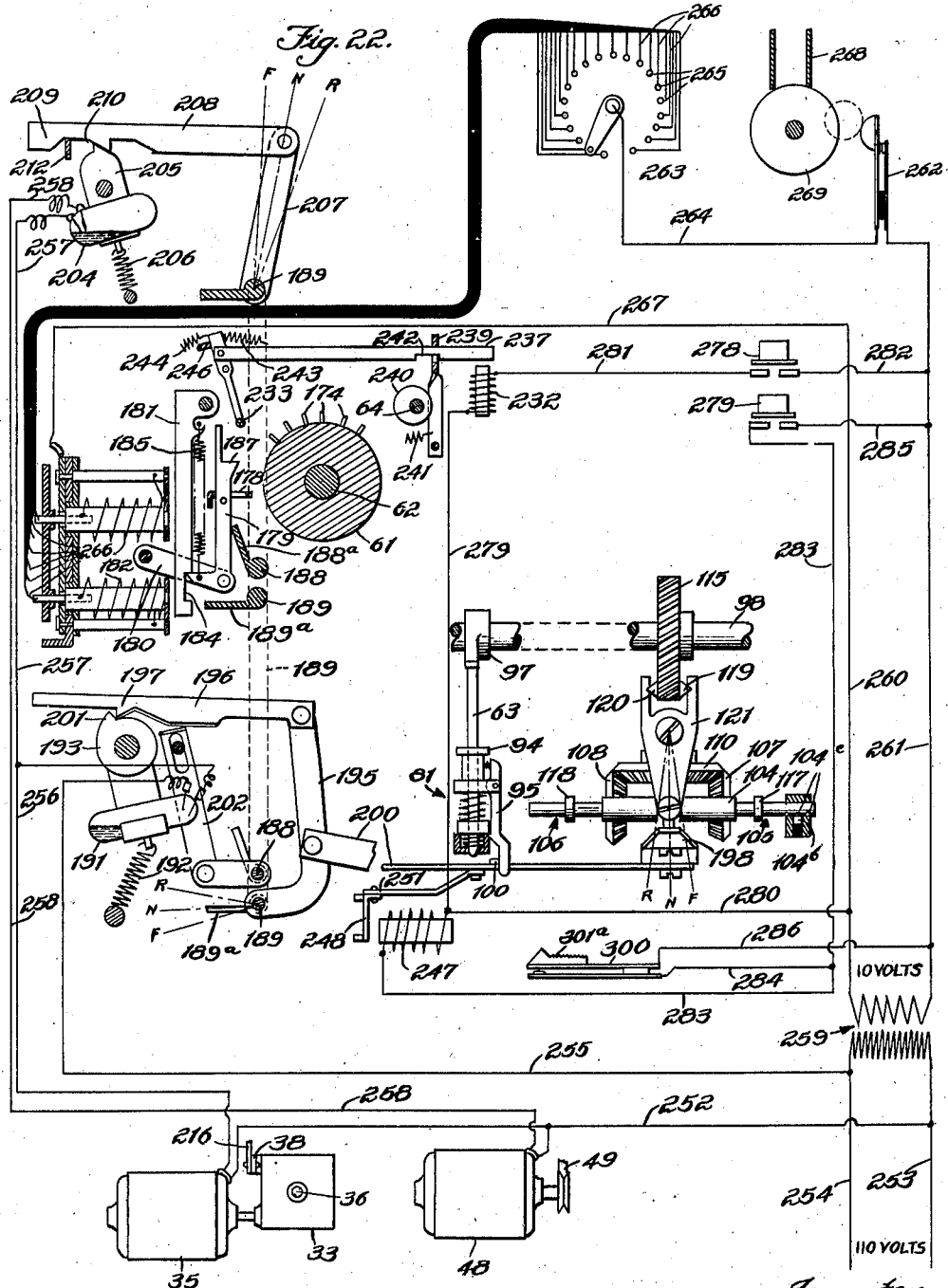

Patented Jan. 4, 1938

2,104,032

UNITED STATES PATENT OFFICE 2,104,032

AUTOMATIC PHONOGRAPH

Clifford H. Green, Grand Rapids, Mich., assignor to Automatic Instrument Company, a corporation of Michigan

REISSUED
JUL 23 1940

Application February 20, 1934, Serial No. 712,218

15 Claims. (Cl. 274—10)

This invention relates to improvements in automatic phonographs, and one of the main objects of the invention is to provide a simplified mechanism which is positively interconnected for perfect coordination between concurrently and consecutively related moving parts, so that the functioning of various elements is inherently in correctly timed relation to the functioning of the other elements.

Such machines are very frequently installed in public places, and therefore subjected to misuse as well as to a great deal of deliberate abuse. Accordingly further objects of the invention are to provide a construction which is not likely to get out of order, which does not require frequent and accurate adjustment and servicing, and in which replacements which might become necessary are easily made.

Another object is to provide for plural selectivity of records from a single coin chute to eliminate duplication of complicated coin detecting mechanism.

Also this invention includes the provision of means for playing records at different speeds. Some standard records are to be played at a normal operating speed, and others at a slower speed, and therefore means are provided for predetermining the speeds at which the turntable will be operated according to the position in which the records are stored in the magazine.

Also improvements have been made in the gripping means so that the discs are more securely gripped by the transfer mechanism when lifting the records into and out of the magazine, and placing them on or removing them from the turntable. The record discs are gripped across their diameters, the outer gripping member being mounted on a resilient arcuate arm which encircles the periphery of the discs. Thus very little pressure is needed, variations in the thickness of the discs has no effect, breakage of the records is eliminated, and the discs may be stored closely in the magazine.

Another object is to provide an independent motor for the selector and transfer, and to provide means for stopping the operation of the transfer motor while a record is being played to eliminate noise and vibration.

Another object is to provide a simple, positively acting mechanism for operating the stylus arm, a flanged drum cam being employed to support the arm when off the record, to raise and lower the arm, and also to swing the arm over the turntable.

A further object is to provide an electrical means for initiating the operation of the restoring operations at the completion of the playing of a record so that the arm only has to make an electrical contact, and consequently no power is required from the arm. This is of advantage since at this particular time the arm is moved laterally only by the engagement of the tracing needle in the shallow grooves in the record, and much resistance to the movement of the arm, as in actuating some mechanical part is apt to pull the needle out of the groove or deface the record. This feature of the invention has a further advantage in that the playing may be stopped at any time by providing manually operable means, such as a push button for also closing the contact.

Another object is to provide an improved clutch construction which is quick and positive in operation and suitable for "self stopping", the main clutch parts being mounted on the power shafts and actuated by a part being positioned in the path of one of the clutch elements to trip, the final power for the disengagement being supplied by the drive shafts.

Other objects and advantages will become apparent in the following description, taken with reference to the accompanying drawings, in which an illustrative embodiment of the invention is shown.

Fig. 1 is a plan view of the automatic phonograph mechanism.

Fig. 2 is a vertical longitudinal section taken substantially on the line 2—2 of Fig. 1.

Fig. 3 is a partial elevation, looking from the rear, or opposite side, with parts broken away and parts shown in section.

Fig. 4 is an enlarged fragmental plan view, with parts omitted and parts broken away.

Fig. 5 is a transverse section taken on the line 5—5 of Fig. 4.

Fig. 6 is a repetition of the left hand portion of Fig. 5, with parts shown in "playing" position.

Fig. 7 is a detail of the clutch mechanism, taken on the line 7—7 of Fig. 5.

Fig. 7a is a detail view of lever parts shown in Fig. 5.

Fig. 8 is a transverse section taken on the line 8—8 of Fig. 4.

Fig. 9 is a detail view of parts of Fig. 8 in changed position near the completion of a selecting operation.

Fig. 10 is a detail view of the selector drum.

Fig. 11 is a transverse section of the axis of the transfer operating shaft, taken on the line 11—11 of Fig. 4.

Fig. 12 shows parts of Fig. 11 in a changed position.

Fig. 13 is a detail sectional view taken on line 13—13 of Fig. 11.

Fig. 14 is a longitudinal section of the mechanism, taken on line 14—14 of Fig. 4.

Fig. 15 is taken on line 15—15 of Fig. 14.

Fig. 16, Fig. 17 and Fig. 18 are plan sections on the line 16—16 of Fig. 14, with the parts shown in normal and different operating positions.

Fig. 22 is a diagram showing the electrical connections.

Figure 19:
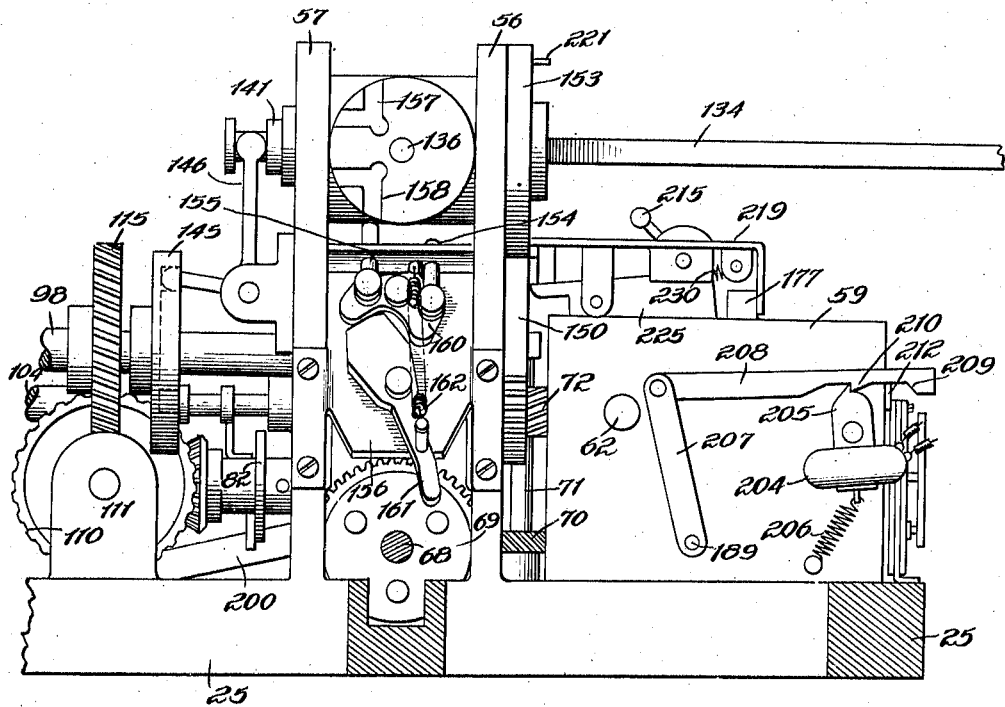
Fig. 19 is a transverse section looking toward the turntable, with the parts in "playing" position, and is taken on line 19—19 of Fig. 4.

The mechanism comprises a skeletonized cast base 25, which is substantially rectangular in plan with one end brought to a point. The record discs 26 are placed edgewise in evenly spaced vertical pockets or slots provided by pairs of stamped plates 27 which are mounted in grooves cut in a casting 28, which forms the base of the magazine 29, see Fig. 21.

The magazine is transversely slidably mounted on parallel rods 30 and 31, which extend through the ears of the assembled plates 27 and notches provided in the front and rear margins of the base casting 28, as shown in Fig. 2.

The rods are fixedly mounted in four upstanding lugs 32 provided on the side rails of the rear portion of the base 25. In the drawings the magazine is shown in substantially mid-position, and as containing ten discs with a record on each side thereof, or twenty records. The sixth disc is in position to be removed at the next operation of the machine, unless a record on some other disc is selected, whereupon the magazine will be moved in one direction or the other to bring the selected disc into position, as will be described hereinafter.

On the longitudinal axis of the base and near one end of the same, the right end as viewed in Fig. 1, is fixedly mounted a standardized multiple ratio transmission unit comprising a housing 33, having a horizontal driving shaft 34, to which a turntable motor 35, bolted to the base, is connected; and, projecting from the center of the top of the housing, is a vertical shaft 36 on which the turntable 37 is removably mounted to rotate with the shaft.

On the front of the housing is rotatably mounted a ratio controlling lever 38, Fig. 2, which is held against a stop 39, for normal speed, by a spring 40; and, as will be understood, when the lever 38 is rotated clockwise, as viewed in Fig. 2, to other positions, the speed reduction ratio of the transmission will be changed, so that the turntable will be rotated at a different speed.

A stylus comprising a long arm 41 having a tracing needle 42, see Fig. 1 and Fig. 3, is pivotally mounted on a shaft 43, which projects upwardly from a post 44 provided on the rear side of the base 25. The stylus is pivoted for vertical movement on a pair of transversely disposed trunnions 45 which are secured to a sleeve 46, which is slidably supported on the shaft 43, and the stylus is partially balanced by means of a weight 47 secured to the rear end thereof so that, when over the turntable, it rests lightly on the surface of a record disc, placed on the table, for tracing the spiral record groove, which causes the end of the stylus to move in toward the center of the table in the usual manner.

On the base at the rear of the turntable transmission housing 33 is bolted a transfer driving motor 48, which is connected by a belt 49 to a transversely disposed drive shaft 50, which is rotatably mounted in spaced bearing posts 51 and 52, Fig. 8, which project upwardly from the base 25. The inner end of the shaft 50 has, keyed thereto, see Fig. 8 and Fig. 2, a worm 53, on either side of which are bearing posts, or pedestals, 54 and 55 arranged on the longitudinal axis of the base; and between the post 55 and the magazine are provided a pair of transfer shaft bearing posts 56 and 57, which are transversely aligned and symmetrically disposed on either side of said axis. At the rear of the base is provided an outboard bearing post 58 in alignment with the posts 56 and 57; and in front of the said posts is mounted a selector mechanism frame comprising spaced vertical end plates 59 and 60 between which is rotatably supported a horizontally disposed selector drum 61 having a shaft 62, the ends of which project through said plates and thus support the drum.

As best shown on the longitudinal section of Fig. 14, three parallel shafts are mounted in the posts 55 and 54, a slidable clutch shifter shaft 63; a rotatable shaft 64, immediately above and at right angles to the worm 53 and shaft 50; and a selector and magazine drive jack shaft 65, immediately below the worm 53, which is positively geared to the shaft 64, to rotate slower, by spiral gears 66 and 67, pinned to the respective shafts.

The shaft 65 is connected for driving the magazine by a line shaft 68 which is connected to the gear 66 by a universal coupling 69; and is connected for driving the drum 61 in synchronism with the magazine, as best shown in Fig. 8, through a spiral gear 70 keyed to a vertical jack shaft 71 having a worm 72 which meshes with a worm gear 73 fixedly mounted on the medial position of the drum 61. The jack shaft 71 is rotatably mounted in a step bearing 74, formed on the base, and an upper bearing bracket 75 mounted on the post 56; and the gear 70 meshes with the same gear 66 to which the magazine line shaft 68 is connected so that perfect synchronism between the movement of the drum and magazine is assured.

Figures 20, 21:
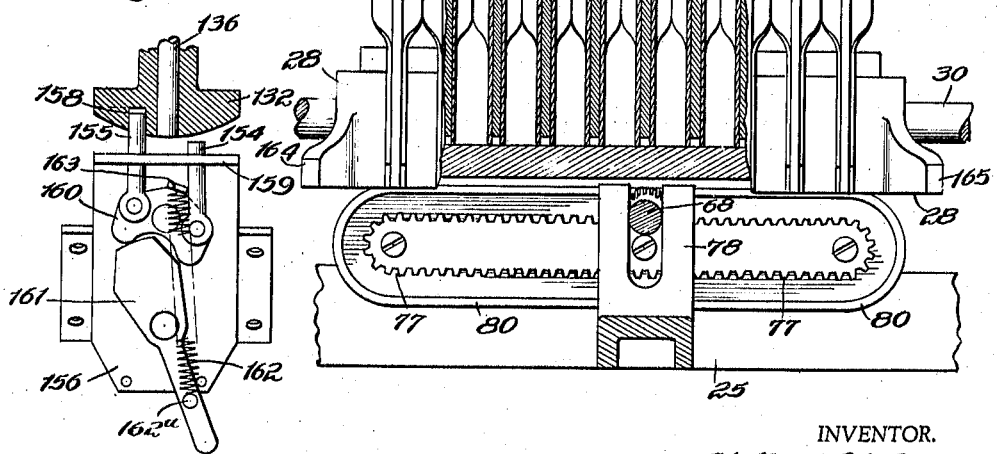
Fig. 20 is a detail view substantially on the line 20—20 of Fig. 14.
Fig. 21 is a section of the magazine, taken on the transverse line 21—21 of Fig. 2.

As best shown in Fig. 2 and Fig. 21, the left end of the line shaft 68 has a pinion 76 formed thereon which meshes with an endless rack 77, fixedly secured to the under side of the magazine base 28. The end portion of the shaft 68 is guided for vertical movement between a pair of lugs 78, formed integrally on the machine base 25; and the pinion 76 is maintained in mesh with the rack 77, on the upper and lower sides and around the ends thereof, by means of a projection 79, formed on the extreme end of the shaft 68, which travels in contact with an endless flange 80, which surrounds the rack 77. Thus as the selector drum 61 is rotated, the magazine is moved back and forth, or reciprocated on the rods 30 and 31. The arrangement is such that the magazine has one complete reciprocation for each revolution of the drum.

The drive shaft 50 is normally connected to the magazine and to the selector drum, for driving the same, by a clutch 81 which is similar to the clutch shown in Fig. 7, and comprises a flanged member 82 positively connected to the driving member, in this instance the shaft 50. The flange 84 is integrally formed on the hub of a worm gear 83, which is rotatably mounted on the shaft 64, and is constantly in mesh with the worm 53. Adjacent the flange 84, a collar 84a having a tooth 85, is pinned to the shaft 64. The tooth 85 is engageable by an offset hook lever 86, which is pivotally mounted on the face of the flange 84. In the clutch 81 the lever 86 is normally in engagement with the collar 84a to connect the worm wheel to the shaft 64.

The lever 86 is yieldably retained in rotative positions by means of a spring plate 88, which is compressed under the head of the pin 89 on which the lever 86 is mounted in the manner shown in Fig. 5. The pin 89 extends through the flange 84, and the spring plate is positioned on the opposite side of the flange. The hooked portion 90 of the lever 86 has an offset cam surface 91, and the opposite offset portion has a cam surface 92, so that the lever may be rotated to engage or disengage with the toothed collar 84a, as the lever is being carried around on the flange 84, by striking one or the other of said offset cam surfaces 91 or 92.

In the clutch 81, this is accomplished by shifting a sleeve 93, which has a projecting flange collar 94 into the path of one or the other relatively offset portions of the hooked clutch lever. Referring to Fig. 16, the sleeve 93 is slidably mounted on the shaft 63, and on the sleeve is pivotably mounted a latch lever 95, which is normally hooked over a collar 96, which is pinned to the shaft 63, as best shown in Fig. 16. In normal position, the shaft 63 is pressed to the left by means of a cam 97, which is fixedly mounted on a transfer drive shaft 98. This shaft 98 is parallel with the motor driven shaft 50, and is rotatably mounted in the bearing posts or pedestals 56, 57 and 58, as best shown in Fig. 11.

Referring again to Fig. 14 and the subsequent figures on the same sheet, the shaft 63 is normally shifted to the right to compress the spring 99, seated in the bearing post 54, so that the flange 94 is positioned in the path of engaging cam surface 91 of the clutch lever 96, and the worm gear 83 is thereby connected to the shaft 64 and thence to the magazine and selector drum.

The magazine and selector movement is stopped by a lever 100 striking against the end of the latch 95 to release the clutch as will be described hereinafter. This permits a light spring 101, compressed between the sleeve 93 and the collar 96, to expand and move the sleeve 93 over against the bearing post 55, and position the collar 94 in the path of the offset unlocking cam surface 92 of the lever 86 to rotate and disengage the clutch lever from the collar 84.

When this occurs, the shaft 98 is started into counterclockwise rotation, in a manner which will be described more fully hereinafter, to remove a record from the magazine and place the same on the turntable. This moves the cam 97 away from the end of the shaft 63, and allows the shaft 63 to be moved to the left under the action of the heavy spring 99, which compresses the lighter spring 101 until the latch 95 again engages behind the collar 96, as shown in Fig. 18. The latch is urged into engagement with the collar 96 by a small spring 102 which is seated in the reduced portion 103 of the sleeve 93, and is compressed under the left end of the latch 95.

As will be more fully described hereinafter the shaft 98 is rotated counterclockwise slightly less than a complete revolution to place a record on the turntable, and the cam 97 then stands in the position indicated in broken lines in Fig. 14 until the playing is completed.

When the playing is finished the shaft 98 is rotated back, clockwise, to the normal position shown in full lines in Fig. 14, and thereupon strikes and restores the shaft 63 to normal position with the flange 94 again standing in the path of the engaging cam surface 91 to restore and connect the clutch 81 in readiness for driving the magazine and selector at the next operation of the machine.

Thus in normal condition, with the machine idle, the clutch 81 is engaged with the parts in the position shown in Fig. 14 and Fig. 16. At the end of the selecting movements, the clutch is tripped and the parts are momentarily in the condition shown in Fig. 17, until the cam 97 moves away. Then the parts stand as shown in Fig. 18 until the completion of the playing. When the playing is completed, the cam 97, in returning to normal, moves the rod 63 over to its normal position to cause the clutch to reengage.

With particular reference to the plan view, Fig. 4, and the transverse section of Fig. 8, immediately above the shaft 50 and slidably mounted in the bearings 51 and 52, is a clutch shifter rod 104 for alternately operating a clutch mechanism, generally indicated at 105 for operating the transfer drive shaft 98 forwardly to remove a disc, and a clutch mechanism 106 for operating the same reversely, that is to replace the disc in the magazine.

Clutch mechanisms 105 and 106 are provided for operating the transfer, which are similar in construction to the clutch 81, and like reference characters refer to like parts. However these two clutches are normally disengaged. On the portion of the shaft 50 between the bearing posts 51 and 52, are loosely mounted a pair of bevel pinions 107 and 108 which are separated by a spacer sleeve 109 and mesh with the opposite sides of a bevel gear 110.

This gear 110 is keyed on a shaft 111 which is rotatably mounted in short bearing pedestals 112 and 113, rising from the base 25, and the shaft extends transversely under the shaft 98 to which it is positively geared by a worm 114, keyed to the shaft 111, which meshes with a gear 115, fixedly mounted on the shaft 98.

The toothed collars 84 of these two clutches are formed integrally on the hubs of the respective pinions 107 and 108, as shown in Figs. 7 and 8, and the flanges 82, on which the levers 86 are pivotally mounted, are disposed between their corresponding pinions and the adjacent bearing posts, and are fixedly pinned to the shaft 50, so that, in these clutches, the levers rotate with the driving member instead of with the driven member, as in clutch 81.

The shifter rod 104 has a medial groove 116 for the engagement of the operating levers, to be described; and has flange collar portions 117 and 118 for respectively operating the levers of the clutches 105 and 106. When the shifter rod 104 is in the normal neutral, or mid-position as shown in Fig. 4, Fig. 5, and other figures, the collars 117 and 118 are both in position to engage the respective offset portions 92 and disengage both of the clutches 105 and 106. When the rod 104 is shifted to the right, from neutral to forward position, indicated by the radial trace F, the cam portion 91 of the lever of the clutch 105 is contacted and the clutch 105 is thereby engaged to connect the pinion 107 to the motor driven power shaft 50 and thus rotate the shaft 98 counterclockwise, as viewed in Fig. 14; and when the rod 104 is shifted from neutral to the left, or into reverse position R, the gear 108 is likewise connected to drive the shaft 98 reversely or clockwise. It will be observed that either clutch is disconnected when the shifter rod 104 returns to or passes the neutral position N. The shifter rod 107 is yieldably retained in neutral, forward and reverse positions by means of a spring pressed detent plunger 104C mounted in the bearing post 52, which engages in suitable notches 104b milled in the rod 104, see Fig. 8.

The clutches are always disconnected or disengaged when the shaft 98 completes its partial rotation in either direction, by means of lugs 119 and 120, Fig. 11, which are mounted in offset relation on the opposite sides of the driven gear 115. A horizontally disposed lever 121 is pivotally mounted on the upper end of the bearing pedestal 112, Fig. 4, and is provided with a downwardly projecting pin 122 which is engaged in the groove 116 and connects the lever to the shifter rod 104. The opposite end of the lever 121 is bifurcated and has arms 123 and 124, shown in section in Fig. 11, loosely embracing the edge of the gear 115 in contacting relation with the lugs 119 and 120.

Therefore, referring particularly to Fig. 11, when the restoring movement of the shaft 98 is being completed, with the lever 121 and the rod 104 shifted to reverse the movement of the shaft in the last restoring movement of the preceding cycle of operations, the arm 124 had been against the side of the gear 115 until the lug 120 moved down into contact with the arm 124 and forced it away from the gear and thus moved the lever 121 into the normal neutral position, which of course stopped the rotation of the gear, leaving the parts standing as shown.

Then when the rod is next thrown into forward position in the cycle of operations, to the right from neutral, the finger 123 is moved over towards the adjacent side of the gear and the lugs move up away from the fingers and around with the gear and until the lug 119 comes up from below and contacts the finger 123 to move it back to the right and restore the lever 121 and rod 104 to neutral position and stop the forward movement of the shaft 98 until the rod 104 is shifted into reverse position to effect the reverse and restoring movement.

The construction of the transfer mechanism, which will now be described, is particularly shown in Fig. 2, Fig. 11, Fig. 14 and Fig. 15, and the rear elevation of Fig. 19.

In alignment with and immediately above the shaft 98 and in the bearing pedestals 56 and 57 is rotatably mounted a barrel 125, shown in section in Figs. 11, 14 and 15, which has an axial bore 126 extending through its pintles 127 and 128, and has a transverse bore 129 in the portion between the bearings.

In the transverse bore 129 are slidably mounted gripper support members comprising a sleeve 130 and the stem 131 of a button or disc member 132. The sleeve 130 is formed integral with a rectangular, outer finger supporting block 133 which is guided between the cheeks of the bearing pedestals 56 and 57 to support the arm 134 upright in the normal position of the transfer, the arm 134 being fixedly secured to the block 133. The cheeks of the bearings are cut away at 135 to allow the block to rotate in the forward positions of the transfer in which the arm is rotated selectively ninety degrees to the right or to the left to lay the discs flat on the turntable.

A small rod 136a extends centrally through the sleeve 130 and rigidly connects the button member 132 to an arcuate grooved inner record gripping block 136. A sleeve 137, pinned to the rod 136a and gripper block 136, is provided, which extends slidably into the bore of the sleeve 130 and is splined thereto by a key 138, seated in the sleeve 137, for preventing relative rotation between the inner gripper 136 and the outer gripper 139, which is fixedly mounted on the outer end of the arm 134, Fig. 2.

Normally the outer gripper is supported by a bar 139a, rising from the base 25; and in playing position the block 139 rests on an upstanding bar 139b which is bolted to the opposite end of the base at the right of the turntable.

The gripper blocks 139 and 136 are drawn together to grip a record disc by a spring 140 which is compressed between the inner end of the sleeve 138 and the bottom of the bore in the sleeve 130; and normally the grippers are separated by means of a wedge plunger 141. The plunger is slidably disposed in the axial bore 126 and has a bifurcated and reduced end portion 142 which embraces the rod 136a and extends between the inner ends of the sleeve 130 and the stem 131, so that, when the plunger is forced inwardly, the wedging surfaces 143 separate said inner ends and open the grippers to release the record.

In Fig. 14 the above parts are shown in normal condition, with the gripper open; and in Fig. 15, the plunger 141 has been withdrawn to allow the gripper to close, under the action of the spring 140, and engage the periphery of a record disc. The arcuate arm 134, Fig. 2, is parallel with and encircles the discs in the magazine. This permits close spacing of the discs; and the grooved gripper blocks are in the form of segmental arcs so that very little pressure is required across the discs to hold them very securely.

As clearly shown in Fig. 2 and Fig. 11, the transfer drive shaft 98 has, fixedly secured thereto, a face cam 145 for the operating of the plunger 141 to close the grippers in the initial movement of the shaft 98 in either direction by moving the plunger 141, and to open the grippers at the ends of either movement, so that when the transfer is at rest with the arm 134, either over the magazine or in the forward position encircling the turntable, the grippers are open, but before the transfer barrel 125 starts to rotate in either direction the grippers are closed to grasp the disc.

This is accomplished by means of a bell crank lever 146 which is pivotally mounted in a bracket 147, secured to the pedestal 57. The lever 146 has a bifurcated end 148 which engages in a groove 149 provided in the outer end of the plunger 141, and has a ball portion 150 which is engaged in the groove 151 of the cam 145. As shown in Fig. 13, normally the ball 150 is in the radially remote portion of the cam groove and positions the bell crank lever 146 for moving the plunger in, to separate the grippers. Then in about the first ninety degrees of the forward rotation of the shaft 98, counterclockwise, the ball is moved into the one hundred and eighty degree dwell portion of the cam groove which is closer the axis of the shaft 98. This rotates the bell crank 146 clockwise and withdraws the plunger 141 for gripping the discs until the last portion of the shaft movement in which the ball 150 travels back to the remote portion of the cam groove and reopens the grippers to release the disc. In the reverse movement of the shaft in which the disc is lifted from the turntable and returned to the magazine, the plunger operation is automatically reversed to grip the disc before it is lifted, and to release the disc when it is back in position in the magazine.

The transfer barrel 125 is rotated, after the grippers are closed, by means of a mutilated gear 152, Fig. 2, keyed to the end of the shaft 98 which projects forwardly through the bearing pedestal 56; and this gear meshes with a mating mutilated gear 153, pinned to the outer end of the barrel pintle 128. The gears 152 and 153 are provided with intermeshing gear teeth on substantially a little less than one-half their circumferences so that in the first quarter of the movement of the shaft 98 time is allowed for the grippers to close and grip the adjacent disc in the magazine. During the next half of the movement the gear teeth engage and the barrel is rotated to lift the disc out of the magazine and swing the disc onto the turntable; and during the last quarter of the movement the cam 145 opens the grippers to release the disc and leave it on the turntable until the playing is finished. By reversing the movement of the shaft 98, these operations are automatically performed in reverse order to restore the disc to the magazine.

During the turning movement of the barrel and transfer parts, and while the block 133 is out of engagement with the cheeks of the bearing pedestals 56 and 57, the button 132 is eccentrically engaged by one or the other of a pair of selectively projected plungers 154 and 155, slidably mounted in a plate 156 fixedly secured to said pedestals, to turn the gripped record disc into the horizontal plane of the turntable, or back into the vertical position for insertion in the pockets of the magazine.

The spherical face of the button 132 is provided with angular grooves 157 and 158 which extend parallel to an axial line between them and inward from the margin, and then at right angles again outwardly, Fig. 5. Then as the button swings past the plungers in the forward movement of the transfer, the projecting plunger enters one side of its groove, strikes the angle and rotates the button, and transfer arm, laterally ninety degrees and then passes out the other tangential portion of the groove. During the return movement, the plunger passes through the groove in the opposite direction and turns the arm back to the vertical position.

The plungers 154 and 155 are slidably supported, Figs. 14 and 20, in the upturned end portion 159 of the plate 156, and the lower ends of the plungers are pivotally connected to opposite sides of a rocker plate 160, which is centrally pivoted to the supporting plate 156. The lower edge of the rocker plate 160 is centrally recessed to accommodate the angular end of an operating lever 161, medially pivoted on the plate 156, below the rocker plate, and said angular upper end is formed so that the rocker plate is locked in either position in which it is moved by moving the lower end of the lever 161.

Thus, as best shown in Fig. 20, one of the plungers 154 or 155 is projected into the path of the button 132 and the other withdrawn, according to the position of the lever 161. The final movement of these parts in either direction is affected by means of a spring 162 which is extended between a lug 163, formed on the upper portion of the plate 160, and a pin 162a secured in the lower portion of the lever 161 to give the parts a "snap over" action as the spring passes over the line intersecting the pivotal axes of the rock plate and lever.

At the ends of the movements of the magazine, in either direction, the lower end of the lever 161 is contacted by lugs 164 or 165 provided on the sides of the magazine base, see Fig. 1 and Fig. 2, and the relative positions of the plungers is thereby reversed. Therefore, during one directional movement of the magazine the records on one side of each side of the discs will be selected by turning the corresponding faces of the discs up on the turntable; and in the opposite movement of the magazine, the records on the opposite sides of the discs will be selected.

The stylus 42 is also permanently connected for operation to the shaft 98 so that its movements are positively coordinated with the movements of the transfer to swing the arm over and lower it onto the outer portion of the record when a disc is placed on the turntable, and to raise and swing the arm away from the turntable before the disc is removed.

The base 166 of the stylus arm 41 has a forwardly projecting arm portion 167, Fig. 3, which rides on the flange 168 of a cam 169 which is fixedly mounted on the rear portion of the shaft 98, particularly shown in Figs. 3, 4 and 11. The flange 168 normally lifts the stylus clear of the turntable, but has a flattened portion 170, Fig. 3, which lowers the arm in the extreme forward rotation position of the shaft 98, clockwise in Fig. 3, and the arm is swung over the table by means of a downwardly projecting pin 171, secured in the arm 167, which pin is engaged in a groove 172 formed in the periphery of the cam 169.

The groove has a circumferential portion near the outer end of the cam for holding the stylus in normal position away from the turntable, as best shown in Fig. 1. The groove then extends helically on the surface of the cam to swing the arm over the table, and terminates in a widened portion 173, which leaves the pin free to move as the stylus moves toward the center of the disc in playing a record. As is manifest, during the return or reverse movement of the shaft 98, the stylus is first lifted, and then swung back out from over the turntable.

The selecting operations, mentioned above, are controlled as follows, particular reference being made to from Fig. 5 through to Fig. 12. As described, the selector drum 61 is rotatably mounted between end plates 59 and 60, which are fixedly secured to the base, and the drum is positively connected for rotation with the movement of the magazine carriage to make one complete revolution with each complete reciprocation of the magazine.

The surface of the drum is provided with a helically arranged row of regularly spaced projecting selector lugs 174, extending the length of the drum, and two relatively reversed semi-circumferential helical rows of playing speed control buttons 175, which are spaced between the adjacent lugs, as particularly shown in Fig. 10.

Between the selector frame plates 59 and 60 are fixedly mounted a slotted selector lever support bar 176, Fig. 8 or 11, a slotted selector latch support bar 177; and a selector lever spacing comb 178, in which is suitably supported a series of selector units corresponding to the twenty sides of the ten discs.

Each selector unit comprises: a selector lever 179 which projects through a corresponding slot in the comb 178, and has its lower end pivotally connected to a lever 180, which is pivotally mounted in the bar 176; a depending latch lever 181, which is pivotally mounted in the bar 177; and a solenoid 182, the solenoids being arranged in two rows to save space laterally.

The selector levers 179 have projecting arm portions 183 for engagement in notches 184 provided in the latches 181; and the corresponding levers and latches are connected by springs 185, so that, in normal position, as shown in Fig. 8, the selector levers are drawn upwardly and locked away from the drum and out of engaging relation with their corresponding lugs 174.

When a solenoid is energized, the corresponding latch is attracted and disengaged from its selector lever. A pin 186, secured in the lever, contacts with the under side of the comb 178 so that, upon being released, the upper end of the lever is swung inwardly towards the drum and into the path of the corresponding lug 174, as indicated in broken lines in Fig. 8. As the drum is rotated, the lug 174 contacts with an angular projection 187 on the upper portion of the lever, and forces the lever downwardly, as shown in Fig. 9. In the continued downward movement of the lug, the lever is forced away and out of engagement by the angular under edge of the projection 187. When this occurs, the solenoid has been deenergized and has allowed the latch 181 to be pulled, by the spring 185, into contact with the lever 179 so that the projection 183 enters the notch 184 and strikes the upper end of the notch when the lever is free from the lug and pulled upwardly by the spring. This restores the selector parts to the normal locked position.

Rotatably mounted in and extending between the frame plates are provided a starting switch operating shaft 188, in front of the row of selector levers, and a clutch operating shaft 189. The shafts are provided with lateral vanes 188a and 189a, which project into cooperative relation with the levers so that, when any of the selector levers are first released, the switch shaft 188 is rotated slightly clockwise; and when a lever is pressed downwardly, as shown in Fig. 9, the vane 189a of the shaft 189 is contacted by the lower end of the lever, Fig. 9, and the shaft 189 is rotated counterclockwise.

On the outer face of the frame plate 60, Fig. 5, is rotatably mounted a mercoid motor starting switch 191 which is normally held open, but is urged to close by means of a spring 192 which is connected to the switch arm 193 and anchored to a pin 194, fixed in the plate 59. The switch is held open against the action of the spring by the detent plunger 104b, Fig. 8, which yieldably holds the clutch shifter rod 104 in normal, or shifted positions.

The connection to the shifter rod 104 is made as follows: An upwardly extending curved lever 195 is pinned to the outer end of the shaft 189, and a horizontally disposed lever 196, having a tooth 197, is pivotally connected to the upper end of the lever 195. A vertical clutch shifter lever 198, Fig. 5, is pivotally mounted on the base 25, and has a pin 199 in the upper end thereof, which is engaged in the medial groove 116 of the shifter rod 104; and the lower end of the lever 198 is pivotally connected to the lever 195 by a shifter bar 200, so that the shaft 189 and parts connected thereto, such as the lever 195 and vane 189a move with the shifter rod 104, and are thereby also yieldably held in neutral, forward, or reverse positions by the detent 104b. Accordingly, in the normal neutral position, the switch is held open, against the action of the spring 192, by the tooth 197 of lever 196, which is engaged with a tooth 201, provided on the upper portion of the switch arm 193, as shown in Fig. 5.

When a selector lever is first released and the shaft 188 thereby rotated clockwise, the lever 196 is lifted out of holding engagement with the switch 191 by a plate 202 which is slidably mounted on the frame end plate 60 and pivotally connected to a crank arm 203 which is pinned to the outer end of the shaft 188, the parts being then moved into the positions shown in Fig. 6.

From this, it will be seen that the starting switch is not affected when the shifter parts are moved into forward position F, nor when the parts first return to neutral position N; but, when the parts shift from neutral to reverse R, the lever 196 is moved to the right and is then in position to again engage with the switch lever tooth 201 when the parts return to neutral, providing all of the selector levers have been restored and the slide 202 has been allowed to drop back down into normal position, shown in Fig. 5, but if one or more of the selector levers are still in released condition and not restored, the final restoring movement from reverse to neutral will not reopen the starting switch 191, and the cycle of operations will be repeated.

An auxiliary switch 204, normally closed, is provided for cutting out the transfer motor 48 during the playing of a record. This switch is carried by an arm 205, which is pivotally mounted on the outer face of the left side selector frame plate 59, and is urged into closed position by a spring 206, anchored to the plate 59. This is particularly shown in Figs. 11, 12, and, looking from the opposite direction, in Fig. 19.

A crank arm 207 is fixedly secured to the outer end of shaft 189, and a horizontally disposed latch lever 208 is pivotally connected to the upper end of the crank arm. The lower edge of the outer portion of lever 208 is notched to provide an angular surface 209 and a tooth 210 for engagement with a cooperative tooth 211 provided in the upper end of the switch lever or arm 205. The normal position is shown in Fig. 11; the position when the clutch operating parts are shifted to forward is shown in full lines in Fig. 12; and the playing position is indicated in Fig. 19, the clutch parts having been moved from forward back to neutral positions.

Thus in normal condition, the latch 208 is disengaged from the switch lever, the outer end of the latch being at that time supported by a plate 212 which is fixedly mounted on the edge of the frame 59. When the clutch shifter parts, including shaft 189, are moved to forward position, which is to place a disc on the turntable, the latch 208 is moved to the left, Fig. 12, and the tooth 210 is hooked over the tooth 211, the switch 204 being still held closed by the spring 206. Next the clutch parts are moved back to neutral, and the switch is thereby opened, as shown in broken lines in Fig. 12 and in full lines in Fig. 19. This stops the transfer operating motor during the playing.

When the playing is stopped, in a manner which will be described hereinafter, the shaft 189 is moved from neutral, N, to reverse, R. This moves the latch 208 to the extreme right, Fig. 12, and the end of the latch is cammed upwardly by the angular surface 209 riding on the edge of the support plate 210, and the latch is disengaged from the switch lever, which, of course, allows the spring 206 to rotate the switch back to closed position. This restarts the transfer motor to return the disc to the magazine. In the final clearing movements, the shaft and latch 208, is moved back to the normal, neutral position.

As mentioned above, some discs carry records which are to be played at slower speeds, and for providing a machine in which both kinds of records may be used, a plurality of manually operable set levers 215 are provided. In a machine for playing twenty records inscribed on the opposite sides of ten discs, as shown in the drawings, a bank of ten set levers may be provided since the records recorded on the opposite sides of each disc are played at the same speed.

The mechanism controlled by the set levers 215 is best shown in Fig. 1, Fig. 2, Fig. 8, and Fig. 11. A bar 216 is attached to the speed control arm 38, of the variable speed transmission 33, Fig. 2. This bar is pivotally connected to the lever 38, and extends across the inner side of the transfer mechanism frame and adjacent the outer faces of the mutilated transfer drive gears 150 and 153. The left end of the bar is guided and slidably supported in a slot 217 provided in a downwardly bent portion 218 of a horizontally disposed frame plate 219, Fig. 8, which is fixedly mounted on the selector frame members 59 and 60; and the bar is provided with a tooth projection 220 which, when the end of the bar is raised, is positioned in the path of a pin 221 mounted in the face of the gear 153.

Accordingly when the gear 153 is rotated clockwise, Fig. 2, to transfer a disc to the turntable, the pin 221 normally misses the tooth 220, and the arm 38 remains in normal position, but, when the lever 220 is raised, the pin 221 in the final forward movement of the transfer will engage the tooth 220 and move the bar 216 to the left and thus hold the arm 38 in a position for obtaining a slower or different speed ratio. Then, as the transfer moves reversely, the bar 216 is released and the spring 40 returns the arm 38 to normal position for running the turntable at a more usual speed.

The levers 215 extend through slots provided in the frame plate 219 and are rotatably mounted on a shaft 222 which is supported by said plate. The lever members 215 have a flat cam surface 223 near the shaft and an angularly related flat surface 224 at a greater radial distance from the shaft. Said surfaces of each lever are in cooperative contacting relation with an irregularly formed floating plate 225 for lifting the bar 217. Each of said plates is also in cooperative relation with a corresponding pair of the buttons 175, mounted on the drum, so that a button moves into cooperative relation with each lever as the corresponding discs are opposite the transfer.

A rod 226 is rigidly supported by ears 227, depending from the plate 219, and this rod extends through slots 228 for loosely supporting the inner portions of the cam plates 225, which are provided with fingers 229, which project under the bar 216. The outer ends of the plates 225 are urged upwardly by springs 230 to maintain the plates in contact with the cam surfaces of the levers 215. Thus when the levers are moved forward, as shown in Fig. 11, the corresponding plates are in contact with the lower cam surfaces 223, and the plates are held upwardly so that their lower arcuate surfaces 231 are out of contactual relation with the corresponding button lugs 175. And when the levers set in the other position, shown in broken lines in Fig. 11, the higher cam surfaces 224 are brought into contact with the plates. This lowers the rear ends of the plates and provides a fulcrum so that the lugs 175, in the rotation of the selector drum 61, will strike the arcuate lower edge surfaces 231 and raise the inner ends of the plates to lift the bar 216 to place its tooth 220 in the path of the gear pin 22 so that the discs corresponding to the levers 215 which have been set in the broken line position will be played at a slower speed, the ratio of the turntable transmission being changed by last forward movement of the transfer.

For canceling selections which have been made but not yet played, a solenoid 232 is provided which is fixedly mounted on the bearing post 54, see Fig. 5, which functions to move a clearing bar 233 to the left in said figure, and return the selectively released levers 179 back to normal position in which they are again latched by the latch levers 181, the clearing bar contacting with fingers 234, provided on the upper ends of the levers 179. see Figs. 8 and 11.

The bar 233 has crank arms 235 which extend upwardly and through the selector frame plates 59 and 60, to pivotally support the bar, and the arm 235 adjacent the plate 60 has an upwardly projecting lever portion 236 to which is pivotally connected a horizontally disposed bar 237. The bar 237 projects over the solenoid 232, and extends through a slot 238 formed in the upper end of an oscillating lever 239. The lower end of the lever 239 is pivotally supported by the post 54, Fig. 14, and the lever is urged into contact with an eccentric cam 240 by a spring 241, Fig. 5. The cam 240 is keyed on the outer end of the shaft 64, so that when the shaft is rotated during the operation of the transfer, the lever 239 is continually moved back and forth.

The bar 237 has a notch 242 in the portion which extends through the slot 238, in the upper end of the oscillating lever 239, so that when the solenoid 232 is energized to attract and pull the free end of the bar 237 downwardly, the lever 239 is engaged in the notch 242 and the bar 237 moved to the right to swing the universal bar 233 against the selector levers and restore the same. The free end of the bar 237 is urged upwardly and normally into contact with the upper portion of the lever notch 238 by a spring 243, extended between the bar and the arm 236, and a spring 244 which is stretched between said arm 236 and a plate 245 which is fixedly mounted on the outer edge of the frame plate 60.

The plate 245 also serves to guide and limit the upward movement of 196 which projects through an elongated slot in the plate. The spring 244 urges the arm 236 into contact with an abutment plate 246 which is fixedly mounted on the frame bar 177.

As best shown in Fig. 14, the lever 100, for tripping the clutch 81 and stopping the operation of the selector drum and magazine, is pivotally mounted on the bearing post 54, and the lower end of the lever has a slotted pivotal connection with the medial portion of the operating bar 200 of the clutch shifter train. Accordingly, when a selector lever is pressed downwardly, and the shaft 189 rotated counterclockwise, moving the bar 200 to the left, the selector clutch 81 is disconnected and the forward transfer clutch 105 is connected to start the transfer mechanism into operation to place a disc in playing position.

After the shift for forward movement of the transfer the bar 200 is next moved back to the right, to neutral position, by the contact of the lug 119 with the underside of the horizontal lever 121, and the forward transfer movement is stopped by the disengagement of the clutch 105. At the completion of the playing, the bar 200 is moved to the right, reverse position R, by means of a solenoid 247. The solenoid 247 is fixedly mounted in a lug 248, projecting upwardly from the base 25, and has an armature 249 which is pivotally mounted in a bracket 250 which is fixed to the base 25. The armature 249 is pivotally connected to the bar 200 by a link 251, so that when it is attracted by the solenoid, the bar 200 is moved from the playing to the neutral position, to the right, to connect the clutch 106 for operating the transfer mechanism reversely to restore the record disc to the magazine. At the completion of the restoring movement the bar 200 and clutch operating parts connected thereto are returned to neutral position by the lug 120 contacting the upper side of the lever 121 as described above.

A switch 300 is provided for energizing the reversing solenoid 247, by the inward movement of the stylus arm. The switch is mounted on the upper end of the bearing post 52, and is closed by a depending pawl 301, which is mounted on the arm 167.

The electrical connections, shown diagrammatically in Fig. 22, are as follows:

A terminal of the turntable motor 35, see diagram, Fig. 22, and of the transfer motor 48 is connected by wire 252 to one lead 253 of a 110 volt supply line. The opposite supply lead 254 is connected by wire 255 to one terminal of the starting switch 191. The other terminal of the switch 191 is connected by wire 256 to the opposite terminal of motor 35, and by a branch wire 257 to one terminal of the normally closed transfer motor switch 204, the opposite terminal of which is connected by wire 258 to the second terminal of the transfer motor 48. Thus when the switch 191 is closed both motors are put into operation; from supply line, wire 252 to both motors, from motor 35, wire 256, switch 191, wire 255, back to the supply line 254; and from motor 48, wire 258, switch 204, wire 257, switch 191, and return wire 255. Thus when the switch 204 is opened, with the switch 191 closed, the transfer motor is disconnected; and when the switch 191 is opened, both motors are disconnected.

A step down transformer 259 is connected across the supply leads 254 and 253, and supplies a low voltage current to control circuit lead wires 260 and 261.

A coin operated switch 262 initiates the operation, and selections of records are made by a manually operated commutator 263, one side of the coin switch 262 being connected to the lead 261, and the opposite side of the switch 262 being connected to the commutator arm 263 by wire 264.

The commutator 263 is provided with a plurality of segments 265 corresponding with the records stored in the magazine, and each segment is connected by a wire 266, to the live terminals of the correlated selector solenoids 182. The grounded terminals of the solenoids 182 are connected by wire 267 to the opposite control circuit lead wire 260.

Thus when a coin is manually inserted in the coin chute 268, and the wheel 269 which has peripheral pockets to receive the coils is manually operated to cause the coin to close the switch 262, the position of the commutator arm will determine the record which will be selected, by energizing the selector solenoid 182 and releasing the lever 179 which is related with said record. This circuit comprises supply wire 161, switch 262, wire 264, commutator arm 263, the contacted segment 265, its wire 266, its solenoid 182, and the common return wire 267 to the opposite supply lead 260.

The restoring solenoid 232 may be operated remotely by a push button 278; and a push button 279 is provided for alternate operation of the transfer reversing solenoid 247. A terminal of each of the solenoids 232 and 247 is permanently connected, by interconnecting wire 279 and wire 280, to the lead 260; and the opposite terminal of the solenoid 232 is connected by wire 281 to the push button switch 278, and thence to line 261 by wire 282. The opposite side of the reversing or playing stop solenoid 247 is connected by a wire 283 to one terminal of the push button switch 279, and by branch wire 284 to one side of the stylus switch 300. The opposite side of the push button switch 279 is connected by wire 285 to the opposite line 261, to which the opposite side of the switch 300 is also connected by wire 286. Thus the stylus arm switch 300 and the push button switch 279 are in parallel relation for energizing the solenoid 247; from solenoid wire 283, switch 279, wire 285 to line 261; and from wire 283, branch 284, switch 300, wire 286, to 261.

To review the operation, the commutator 263 is manually rotated and set to select a desired record. Then a coin is inserted in the chute and the wheel 269 operated to close the coin operated switch 262. This energizes the selector solenoid connected to the contacted commutator segment.

It will be observed that several selections may be made at one time; and the selected records will be played in the order in which the corresponding fingers 174 make contact with the released selector levers, since the motor switch 191 remains closed as long as one selector lever stands released.

When any one of the selector magnets 182 is energized, it attracts its latch 181 and releases its selector lever 179. Thereupon the spring 185 rotates the lever clockwise to the inner end of its slot in the comb 178, and towards the drum. This presses the vane 188a to the right and rotates the shaft 188 to raise the slide 202 and disengage the latch lever 196 from the switch 191 so that the spring 192 will move the switch to its closed position and thus start the two motors into operation. Accordingly releasing a selector lever starts the two motors and initiates the cycle of operations.

At the beginning of the cycle, the transfer clutches 105 and 106 have been disengaged, and the selector clutch 81 is in engagement. Then the operation of the transfer motor, in rotating the shaft 50, starts the selector drum and magazine into coordinated operation, the worm 53, on shaft 50, being in mesh with the worm gear 83, which is connected to the shaft 64 by the engagement of the clutch 81. The shaft 64 is rotatively connected to the gear wheel 66, which is positively connected, through the line shaft 68, for driving the magazine, and through gear 70, meshing with the gear wheel 66, through worm 72 and worm 73 for rotating the selector drum, see Fig. 8 and Fig. 14.

The movements of the drum and magazine continue until the finger 174 corresponding to the released lever contacts with point 187 and forces the lever downwardly to a position where the angular surface below the point forces the lever out of engagement with the finger.

In the downward movement the lower end of the lever 179 contacts the vane 189a and rotates the shaft 189 to move the clutch levers and mechanism connected to the shaft into forward position where these parts are held by the detent 104b. This moves the lever 100 to unlatch the lever 95 and release the selector clutch 81, and shifts the latch lever 208 to the left in position to engage with the switch 204; and moves the shifter rod 104 to the right to position the flange 117 in the path of the offset portion of the hook lever of the clutch 105. When said portion strikes the flange 117, the clutch 105 is engaged to connect the bevel pinion 107 to the shaft 50 and start the transfer shaft 98 into operation, clockwise, as viewed from the front of the machine on which the selector mechanism is mounted.

The energization of the selector solenoid is only momentary and the lower end of the latch lever 181 is immediately moved back into engaging relation with the lever 179 by the spring 185, so that when the lever becomes disengaged from the drum finger 174 and is drawn upwardly it is rotated back into the locked position and thereby restored to normal. This restoring movement permits the vane 188a to move back to the left and allows the slide 202 to move down and lower the bar 196 into engaging relation with the motor switch 191, unless other selector magnets have been energized by the insertion of coins and corresponding selector levers are standing in released position awaiting contact with the drum fingers.

However, upon the restoring of one selector lever, the cam 97 on the transfer shaft 98 is moved out of contact with the end of rod 63 and the shifter mechanism for operating the clutch 81 is conditioned for resetting, the latch lever 95 being reengaged with the collar 96.

The lugs 174 are arranged so that the switch 81 is opened and the drum and magazine stopped when the disc having the record which corresponds to each lug is opposite the transfer mechanism and positioned between the gripper segments 136 and 139. Making the selection between the records on the opposite sides of the discs is determined by the direction in which the magazine is being moved by the contacts of the magazine lugs 164 or 165 with the trip lever 161.

Thus when the magazine is being moved to the right, as viewed in Fig. 5, the lower end of the lever 161 had been moved to the left and the lug, 155, projected into the path of the grooved button, or disc, 132. Accordingly when the transfer barrel is rotated, the left hand sides of the discs will be presented on the turntable. Hence the first ten lugs 174 represent the left hand side of the records in the magazine, and lugs eleven to twenty-one represent the records on the right hand side. Space is provided between the tenth and eleventh lugs and after the twentieth lug to allow for the rotation of the drum while the pinion 76 is working around the ends of the rack 71.

Before the teeth of the mutilated gears 150 and 153 mesh to start the rotation of the selector barrel 125 to lift the arm 134, the gripper cam 145 rotates the bell crank lever 146 clockwise, Fig. 5, to withdraw the plunger 141 and allow the segments 136 and 139 to be drawn together by spring 140, see Fig. 15, and grip the periphery of the record disc.

Next the intermeshing teeth engage and the gear 150 rotates the gear 153, Fig. 2, clockwise to place the record on the turntable, with the outer gripper segment 139b resting on the support 139. As the teeth pass out of engagement the cam 145 rotates the bell crank lever counterclockwise, and forces the plunger back in to wedge the supporting members apart and separate the gripper segments to leave the record disc resting on the table.

In the forward rotation of the transfer shaft 98, the stylus arm pin 171 is first in the circumferential portion of the groove in the cam 169 which is fixedly mounted on the shaft. When the disc is placed on the table, the helical portion of the groove engages the pin and the arm is swung over the edge of the disc and lowered, by the flat surface 170 of the cam flange 168 moving into cooperative relation with the stylus base projection 167.

This movement of the stylus of course occurs during the period in which the gripper is being opened; and when the stylus is lowered the pin 171 is free to travel in the widened portion 173 of the cam groove. At the completion of the forward rotation of the shaft 98 the lug 119, on the gear wheel 115, moves up into contact with finger 123 of the clutch lever 121 and returns the lever, the shifter rod 104, and the remainder of the transfer clutch operating levers to the neutral intermediate condition. In the neutral position both collars 117 and 118 are placed in the path of the offset portions of the hook levers of the clutches 105 and 106. Accordingly the lever of clutch 105, rotating with the shaft 50, strikes the flange collar 117 and the clutch is thereby disengaged and the rotation of the transfer jack shaft is stopped.

In this return from forward to neutral positions, the latch bar 208 is moved to the right, and having been hooked to the switch carrying lever 205 in the forward position, the transfer motor switch bulb 204, see Fig. 12, is rotated clockwise into open position. Thus the transfer motor is stopped, leaving the turntable motor running for playing the record. This stops the operation of all of the transfer machinery during the playing and eliminates the noise and vibration and prevents distortion and interference with the reproduction of the sounds recorded on the disc.

When the needle moves into the spiral grooves of the inner portion of the record, the stylus arm moves over the contact plate 301a of the switch 300. This closes the control circuit,—wire 280, playing-stop solenoid 247, wire 283, branch 284, switch 300, and wire 286 back to the supply line. The solenoid 247 then attracts its armature 249 which is connected to the bar 200, and the train of connected shifter bars and levers is moved from neutral to reverse position. This closes the transfer motor switch 204 and causes the engagement of the reverse clutch 106, thus starting the transfer jack shaft 98 into rotation to reverse the operations described above of the parts which are operatively connected thereto, lifting and swinging the stylus away from the turntable and jack to normal position, at the same time gripping the disc; lifting the record off from the turntable and rotating it back into the vertical plane, replacing the disc in the magazine and releasing the same. Also this reverse movement of the shaft 98 restores and causes the reengagement of the clutch 81, and the shaft is stopped when it again reaches its normal position by the forward lug 119 on the transfer jack shaft gear moving down into contact with the bifurcated plate 121 and returning the shifter rod 104 from reverse to neutral position.

This shifting of the rod 104 moves the bar 200 to the right and the bar 196 to the left to stop the turntable motor and also the transfer motor, bringing the machine to rest, unless, as mentioned above, some of the selections remain unplayed. In that case the final movement of the latch bar 196 to the left will be prevented from engaging the switch 191 by the slide being held in elevated position by the released selector lever, and the cycles of operation will be repeated until all the selector levers are restored.

In this manner a simple and rugged mechanism is provided for performing the manifold operations required. The selecting movements are controlled by one clutch and the different parts are maintained in perfect timing relation by being positively geared to the clutch.

Positively connecting the stylus arm, the gripper and the transfer to one shaft and providing a reversing clutch means for turning the shaft one way to present a record, and then turning the shaft back to restore the record simplifies the mechanism and ensures perfect coordination of these parts, which is not affected by wear.

The speed setting permits the use of fast and slow speed records in the same machine; and selections may be canceled before they are played.

Since electrical phonograph "pick ups" are used, the stopping of the transfer mechanism and motor tends to clarify the reproduction.

While but one illustrative embodiment of this invention has been shown and described, it is to be understood that many alterations and omissions may be made without departing from the spirit of the invention, and the different parts thereof, as defined in my following claims.

I claim:

1. In an automatic phonograph having a magazine for a plurality of records, a selector, a transfer, and a turntable, means for operating the turntable at different speeds, and a set lever for each record for bringing the selector and transfer into a cooperative relation for operating said means to control the speed at which each record will be played.

2. In an automatic multiple record phonograph having a turntable and means for selecting and placing the records individually on the turntable, means operable by said means for running the turntable at different speeds, and a lever associated with each record for bringing said speed control means into operable relation with said selecting means to control the playing speed.

3. In a multiple record phonograph, a turntable, means for rotating the turntable at different speeds, a movable bar for controlling the speed, means for selecting and means for transferring a record to the turntable, the selecting means including a drum having a projection corresponding with each record, a plate lever for each projection movably mounted adjacent the drum, and associated with said bar, and a set lever mounted adjacent each plate lever for optionally moving the corresponding plate into cooperation with its projection so that the plate is moved in the rotation of the drum to bring the bar into cooperative relation with transferring means for operation thereby to control the speed.

4. In a multiple record phonograph, a transfer having movable means for gripping a record and carrying the record between storage and playing positions, a stylus arm, a jack shaft, a gripper cam mounted on the shaft for operating the gripper to close and open to engage or release the discs in said position, mutilated gears for connecting the shaft to the transfer for operating the same, and a stylus arm cam mounted on the shaft for supporting and moving the stylus arm, so that by rotating the shaft in one direction a record is gripped, the transfer operated to present the record in playing position, and then the record released and the stylus moved and lowered into cooperative relation with the record, and by reversing the movement of the shaft said operations are performed in reverse order to return the record and stylus arm to raised position.

5. In a multiple record phonograph, a record transfer, a record gripper mounted on the transfer, a shaft rotatable less than one complete revolution in either direction, the shaft having a cam for opening the gripper near the ends of its movement in either direction and closing the gripper as the shaft begins to move in either direction, and a mutilated gear mounted on the shaft for moving the transfer during the mid-portion of its revolution so that the record is gripped, moved into playing position and then released as the shaft is rotated in one direction, and then again gripped, returned and released as the shaft is rotated in the other direction.

6. In a multiple record disc phonograph, a gripper comprising a pivotally mounted barrel, a pair of members slidably mounted in the barrel, a pair of blocks for engaging opposite edges of the disc, an arm peripherally encircling a portion of the disc connecting the outer block to the adjacent member of said pair, the inner block being rigidly connected to the other said member, a spring acting to move the members together to contract the blocks, and a wedge axially slidable in the barrel for separating the members to separate the blocks.

7. In a multiple record disc phonograph, a gripper comprising a pivotally mounted barrel, two plunger members slidably mounted in the barrel and keyed together for co-rotation transverse to the pivotal axis of the barrel, gripper blocks secured to the plungers for gripping the opposite edges of a disc, a spring for moving the blocks toward each other for contracting the grippers, a wedge slidably mounted in the pivotal axis of the barrel for spreading said plungers to open the grippers, the grippers being mounted in the barrel to rotate when the plunger members project into the path of the wedge and a post projectable into the path of one of the plungers for engaging the same during rotational movement of the barrel on its pivotal axis in transferring a disc to turn the grippers and the disc sideways.

8. In an automatic phonograph, a transfer comprising a pivotally mounted barrel, a pair of gripper blocks having supporting plunger portions slidably mounted in the barrel and splined together, a wedging plunger slidably mounted in the pivotal axis of the barrel and engaged with said portions, the gripper blocks being rotated by the plunger portions in the barrel for rotation with the plunger portions when the plunger portions project into the path of the wedging plunger and a plunger projectable into the path of one of said portions for engaging the same to turn the grippers sideways during the rotation of the barrel on its pivotal axis.

9. In an automatic phonograph, a transfer comprising a pivotally mounted barrel, gripping means rotatably mounted in the barrel and including a disc presented at one end of the barrel, the face of the disc having a pair of cam grooves therein each comprising angularly intersecting portions, a yoke rotatably mounted adjacent the barrel, a pair of slidably mounted posts pivotally connected to the yoke so that when the yoke is rotated in one direction one or the other one of said posts is projected for engaging in a corresponding one of said cam grooves for turning the gripping means laterally in accordance with the position of the yoke.

10. In an automatic phonograph having intermittently operated parts, a rotated drive shaft, and a clutch for connecting the drive shaft to said parts comprising a flange keyed to the shaft, a collar rotatably mounted on the shaft and positively connected to the part which is to be driven, a lever pivotally mounted on the flange and engageable with said collar, the lever being frictionally held in position and having relatively offset radially projecting portions, and a shiftable member projectable into the path of either of said projecting portions to move the lever into or out of engagement with the collar.

11. In an automatic phonograph having intermittently operated mechanisms, a rotated drive shaft, a clutch mounted on the drive shaft including a part positively connected to the shaft and a part loosely mounted on the shaft and positively connected to the mechanism which is to be driven, a lever pivotally mounted on the part connected to the shaft for connecting or disconnecting said parts, the lever having a radial projection for engaging the clutch and a projection in offset relation with said projection for disengaging the clutch, and a control member shiftable into the path of either of said projections for correspondingly operating the clutch.

12. In an automatic phonograph, a reversely operated transfer for carrying a record between storage and playing positions, a rotated drive shaft, reversing clutch means mounted on the drive shaft including a clutch for operating the drive shaft in each direction, each of said clutches including an operating lever pivotally connected to the shaft and having relatively offset radially projecting portions, and a shiftable rod having two spaced flanges which in the neutral position of the rod are positioned in the paths of the projecting portions of said levers for rotating the levers to disengage both clutches, the projecting portion for engaging the lever of the clutch for operating the transfer in one direction being contacted by one flange when the rod is shifted in one direction from its neutral position, and the projection of the lever for engaging the other clutch being contacted by the other flange when the rod is shifted in the opposite direction from neutral.

13. In an automatic phonograph having intermittently operated elements, a rotated drive shaft, a clutch mounted on the drive shaft comprising a flange keyed on the shaft and a collar having a tooth loosely mounted on the shaft and positively connected to the driven element, a lever pivotally mounted on the flange and having a hooked portion for engagement with the collar, and a tail portion, said portions being relatively offset and each having a radial projection, and a member shiftable into the path of either projection for depressing the same to engage or disengage the clutch.

14. In a multiple record disc phonograph, a selector and transfer including a shaft rotatable less than one complete revolution in either direction to move a disc into playing position and to return the disc to a storage position, a rotated driving element, a clutch mounted on the element including an operating lever having relatively offset radial operative projections, and latched shiftable means having a portion positioned in the path of the projection for engaging the clutch, means operated by the selector for unlatching said means for movement positioning said portion in the path of the projection for disengaging the clutch, said means being restored to latched position for reengaging the selector clutch by the final movement of transfer shaft in returning the disc.

15. In a multiple record disc phonograph, a selector, a transfer including a shaft rotatable less than one complete turn forwardly to move a selected disc into playing position and reversely to return the disc to storage position, a cam mounted on the shaft, a selector clutch having radial operative projections which are alternately depressible to engage and disengage the clutch, a shifter shaft spring-pressed into contact with the cam in the normal position of the transfer shaft and thereby held in normal position, and a shifter element normally latched to the shifter shaft and having a flange which is then positioned to contact the projection for engaging the selector clutch, said element being unlatched by the selector and spring-pressed into position for engaging the projection for releasing the clutch and stopping the selector, said shifter shaft being released for movement to relatch with said element when the cam is moved away by rotation of the transfer shaft, and the shifter shaft being moved back to normal position when the cam and transfer shaft returns to normal position to restore said element to normal position for reengaging the selector clutch.

CLIFFORD H. GREEN.